United States Patent
Hecht et al.

[11] Patent Number: 6,000,613
[45] Date of Patent: Dec. 14, 1999

[54] SELF-CLOCKING GLYPH CODE HAVING COMPOSITE GLYPHS FOR DISTRIBUTIVELY ENCODING MULTI-BIT DIGITAL VALUES

[75] Inventors: David L. Hecht, Palo Alto; Richard G. Stearns, Mountain View; L. Noah Flores, Soquel, all of Calif.

[73] Assignee: Xerox Corporation, Stamford, Conn.

[21] Appl. No.: 08/186,212

[22] Filed: Jan. 25, 1994

Related U.S. Application Data

[63] Continuation of application No. 07/814,842, Dec. 27, 1991, abandoned.

[51] Int. Cl.$^6$ ..................................................... G06F 7/10
[52] U.S. Cl. ........................................... 235/456; 235/494
[58] Field of Search .................................... 235/465, 469, 235/487, 493, 494, 456; 250/271

[56] References Cited

U.S. PATENT DOCUMENTS

| | | | |
|---|---|---|---|
| 4,443,694 | 4/1984 | Sanford | 235/465 |
| 5,091,966 | 2/1992 | Bloomberg et al. | 235/494 X |
| 5,168,147 | 12/1992 | Bloomberg | 235/494 X |

FOREIGN PATENT DOCUMENTS

| | | | |
|---|---|---|---|
| 0331758 | 9/1989 | European Pat. Off. | |
| 0469864 | 2/1992 | European Pat. Off. | |
| 60-129891 | 7/1985 | Japan | 235/465 |
| 63-254586 | 10/1988 | Japan | 235/487 |

OTHER PUBLICATIONS

Mansour, "Multi-Tiered Condensed Bar Code," IBM Technical Disclosure Bulletin, vol. 26, No. 2, Jul., 1983, pp. 766–767.

*Primary Examiner*—Harold I. Pitts

[57] ABSTRACT

A self-clocking glyph code is provided for encoding n-bit long digital values (where n>1) in a logically ordered sequence of composite glyphs that are written, printed, or otherwise recorded on a hardcopy recording medium in accordance with a predetermined spatial formatting rule. As used herein, a "composite glyph" is a graphical symbol that has a plurality of predefined, substantially orthogonal, graphical characteristics; each of which is capable of assuming any one of a plurality of predefined graphical states. An n-bit long digital value is distributively encoded in a glyph of this type by decomposing its n-bits, prior to or during the encoding, into a plurality of shorter, ordered, non-overlapping bit strings. The digital values of these bit strings, in turn, are encoded in the states of respective graphical characteristics of the composite glyph in a predetermined logical order, thereby preserving the logical ordering of the bit strings.

5 Claims, 1 Drawing Sheet

6,000,613

SELF-CLOCKING GLYPH CODE HAVING COMPOSITE GLYPHS FOR DISTRIBUTIVELY ENCODING MULTI-BIT DIGITAL VALUES

This is a continuation, of application Ser. No. 07/814,842, filed Dec. 27, 1991 now abandoned.

FIELD OF THE INVENTION

This invention relates to self-clocking glyph codes for encoding machine readable digital information on hardcopy recording media and, more particularly, to self-clocking glyph codes for graphically encoding multi-bit digital values compactly.

BACKGROUND OF THE INVENTION

Self-clocking glyph codes are suitable for transferring digital values of various types (e.g., machine control instructions, data values, memory pointers, and executable binaries) back and forth synchronously between the electronic and hardcopy domains. They, therefore, are a promising interface technology for integrating hardcopy documents and computer controlled electronic document processing systems more or less seamlessly.

A self-clocking glyph code typically is generated by mapping logically ordered digital input values of predetermined bit length, n, into a predefined set of $2^n$ graphically unique symbols (i.e., "glyphs"), each of is preassigned to the encoding of a different one of the permissible input values. Thus, each of the input values is transformed into and encoded by a corresponding glyph. These glyph encodings, in turn, are written on a hardcopy recording medium in accordance with a predetermined spatial formatting rule, thereby producing a glyph code that encodes the input values and preserves their logical ordering.

As will be appreciated, a code of the foregoing type carries the clock signal that is required for transferring the encoded digital values from the hardcopy domain to the electronic domain synchronously. Every input value is represented by a corresponding glyph, so the clock is embedded in the spatial distribution of the logically ordered glyphs. This is why these codes are referred to as "self-clocking" glyph codes. As will be appreciated, the self-clocking characteristic of these codes increases their tolerance to the distortion they may experience when subjected to ordinary photocopying and/or facsimile reproduction. See a copending and commonly assigned Bloomberg et al. U.S. Patent Application that was filed Jul. 31, 1990 under Ser. No. 07/560,514 on "Self-Clocking Glyph Shape Codes", which abandoned in favor of continuing application Ser. No. 07/931,554 filed Aug. 18, 1992 which, in turn, was abandoned in favor of continuing application Ser. No. 08/240,798 filed May 10, 1994, which hereby is incorporated by reference.

Another of the known advantages of these self-clocking glyph codes is that they can be composed of glyphs that are graphically distinguished from each other by machine detectable characteristics that are not easily perceived by the human eye. Thus, these codes can be used for recording machine readable digital information on hardcopy documents, without significantly degrading the esthetic quality of those documents. For instance, the glyphs can be written using inks that are virtually invisible to the human eye under normal lighting conditions. Even more remarkably, glyphs written using visible inks, such as standard xerographic toners, can be of such a small uniform size and written at a sufficiently high spatial density that the resulting glyph code has a generally uniform textured appearance to the human eye. As pointed out in the aforementioned Bloomberg et al. application, digital values can be encoded in the rotation or profiles of such glyphs if the glyphs are rotationally variant or invariant, respectively. Also see the copending and commonly assigned U. S. Patent Applications of Rob F. Tow that were filed Dec. 27, 1990 under Ser. Nos. 07/634,990 and 07/634,371 on "Method and Means for Embedding Machine Readable Digital Data in Halftone Images" now U.S. Pat. No. 5,315,098, which issued May 24, 1994 and "Psychophysically Enhanced Techniques for Embedding Machine Readable Data in Grayscale Images" now abandoned, respectively.

Prior self-clocking glyph codes are especially well suited for encoding single bit digital values ("1" or "0"). Some of these codes also are useful for encoding short (e.g., two bit long) multi-bit values, but the cost and complexity of decoding these known codes tend to increase exponentially as a function of the bit lengths of the digital values that are encoded in their glyphs. This follows from the general rule that $2^n$ filtering steps are required for decoding a glyph code encoding of n-bit long digital values when n>1. Accordingly, there is a need for self-clocking glyph codes that are better suited for encoding multi-bit digital values.

SUMMARY OF THE INVENTION

In response to the above-defined need, this invention provides a self-clocking glyph code for encoding n-bit long digital values (where n>1) in a logically ordered sequence of composite glyphs that are written, printed, or otherwise recorded on a hardcopy recording medium in accordance with a predetermined spatial formatting rule. As used herein, a "composite glyph" is a graphical symbol that has a plurality of predefined, substantially orthogonal, graphical characteristics; each of which is capable of assuming any one of a plurality of predefined graphical states. An n-bit long digital value is distributively encoded in a glyph of this type by decomposing its n-bits, prior to or during the encoding, into a plurality of shorter, ordered, non-overlapping bit strings. The digital values of these bit strings, in turn, are encoded in the states of respective graphical characteristics of the composite glyph in a predetermined logical order, thereby preserving the logical ordering of the bit strings.

Glyphs having at least $2^n$ permissible graphical states are required for encoding n-bit long digital values, but these states may be distributed, in predetermined integer powers of 2, across up to n different graphical characteristics of the glyphs. Therefore, bit strings of equal or unequal length can be employed for distributively encoding polybit (i.e., three bit or longer) digital values in the composite glyphs of a glyph code embodying this invention.

BRIEF DESCRIPTION OF THE DRAWINGS

Additional features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with reference to an illustrated embodiment, it is to be understood that there is no intent to limit it to that embodiment. On the contrary, the intent is to cover all alternatives, modifications and equivalents falling with the spirit and scope of the invention as defined by the appended claims.

Figure 1:
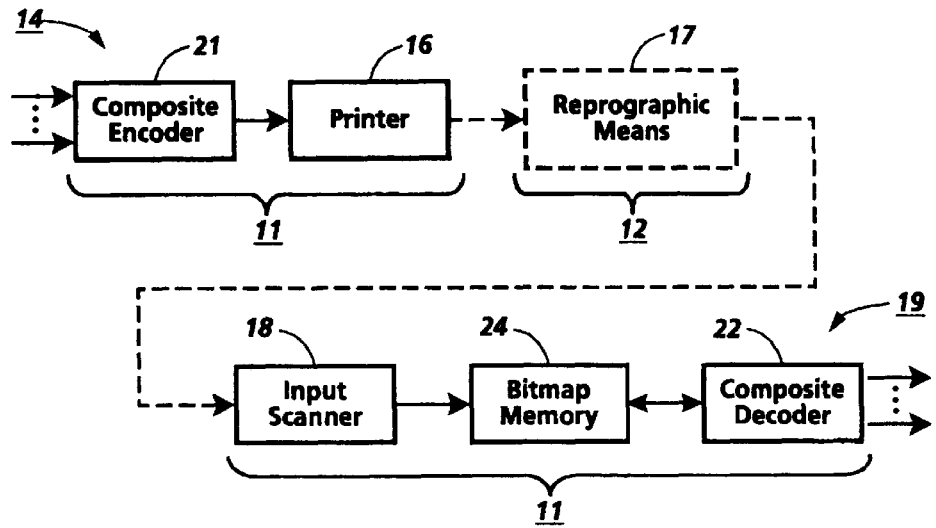
FIG. 1 is a simplified block diagram of a document processing environment in which the present invention may be employed to advantage.

Turning now to the drawings, and at this point especially to FIG. 1, the operating environment for modern electronic document processing systems is becoming a hybrid environment in which human readable and machine readable information are transferred back and forth between an electronic domain 11 and a hardcopy domain 12. For example, images containing human readable and machine readable information may be composed within an electronic document processing system 14 (shown only in relevant part), and some or all of these images may then be transferred into the hardcopy domain 12 by a more or less conventional printer 16. The hardcopy image, in turn, may be reproduced by various reprographic means 17, each as copiers and facsimile systems (not shown), so it may be degraded by optical and/or electrical distortions and/or noise while being replicated. At some point, however, an input scanner 18 may scan the original hardcopy image, or a copy of it, into the same or a different electronic document processing system 19 (also shown only in relevant part), thereby re-transferring the image, or a selected part of it, from the hardcopy domain 12 to the electronic domain 11. As previously pointed out, the image that is captured by the scanner 18 may be degraded by noise and/or distortion, so it is important for all of the information that is intended to be recovered from the scanned-in image to have adequate tolerance to such degradation.

In keeping with this invention, the document processing systems 14 and 19 include a composite encoder 21 and a composite decoder 22, respectively, for transforming machine readable digital information back and forth between the electronic domain 11 and the hardcopy domain 12. The encoder 21 encodes successive n-bit long multi-bit digital input values in a logically ordered sequence of composite glyphs that are printed by the printer 16 on a hardcopy recording medium in accordance with a spatial formatting rule to transfer the encoded digital values to the electronic document processing system 19 in a self-clocking glyph code 23 (see FIG. 2). This glyph code 23 may be printed by the printer 16 alone or in combination with human readable information (supplied by means not shown). When the glyph code 23 accompanies human readable information, it typically is spatially separated from the human readable information and distinguished therefrom in some readily recognizable way, such as by means of its location on the hardcopy recording medium or by means of being confined within a machine recognizable border pattern or the like.

To recover the digital values that are carried by the glyph code 23, a hardcopy image of the code 23 typically is scanned into the electronic document processing system 19 by the input scanner 18, thereby producing a pixel map image of the code 23. This pixel map image suitably is stored in a bitmap memory 24 for decoding of the code 23 by the composite decoder 22. Alternatively, in some implementations of this invention, the decoder 22 may be able to decode the glyphs by matched-filter image processing, thereby avoiding the need for the bitmap memory 24. In either case, the decoding process that is performed by the decoder 22 complements the encoding process that is performed by the encoder 21, so the details of those two devices are dependent upon the particulars of the glyph code that is employed to carry out this invention.

Figure 2:
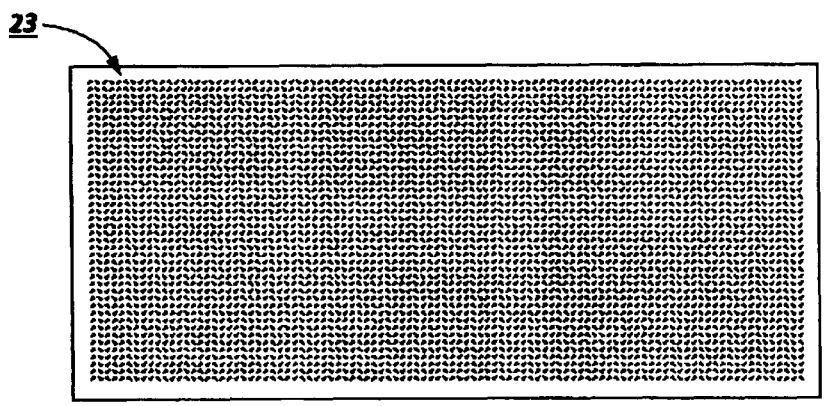
FIG. 2 is a print-out of a self-clocking glyph code for encoding multi-bit digital values in accordance with the present invention.
Figure 3:
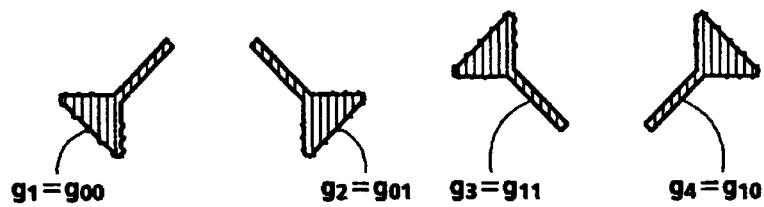
FIG. 3 is an idealized, enlarged view of the composite glyphs of the glyph code shown in FIG. 2.

Referring to FIGS. 2 and 3, in accordance with this invention, the glyph code 23 is composed of composite glyphs 31a–31d (FIG. 3) that have a plurality of substantially orthogonal graphical characteristics, each of which has a plurality of permissible graphical states, for encoding multibit digital values. In this particular embodiment, the digital values are each two bits long. Moreover, the first or leftmost bit of each of those bit pairs is encoded by causing the composite glyph to have a thickened region 32 at its top or bottom with respect to a reference axis (i. e., a nominal horizontal axis as shown), depending on whether the bit that is to be encoded therein is a "1" or a "0", respectively. The other or rightmost bit of each bit pair is encoded by angularly orienting the composite glyph so that its principal axis 33 is tilted to the left or right at about ±45° with respect to the "horizontal" reference axis of the printer 16. These two characteristics are "substantially orthogonal" with respect to each other because their attributes are mutually independent and are capable of being determined independently. For example, the glyphs 31a–31d can be decoded by sequentially examining each of them with two filters, one of which discriminates between the right-hand and left-hand tilt of their principal axes 33, and the other of which discriminates between the upper and lower locations of their thickened regions 32. Thus, an error in decoding either one of the two bits has no significant affect on the reliability of the decoding of the other bit, or one set of data can be read while the other is ignored.

As will be appreciated, the glyph code 23 is only one example of a self-clocking glyph code that can be constructed in accordance with this invention. The positioning of the thickened regions 32 of the glyphs 31a–31d and the tilt of their principal axes 33 are characteristics that can tolerate substantial imaging degradation, so the code 23 can be printed at a spatial density that approaches or even exceeds the spatial frequency acuity of the human eye under normal viewing conditions, even when such degradation is an issue of concern. Moreover, it will be understood that the glyphs 31a–31d may be constructed "on the fly" by using the individual bits (or, more generally, bit strings) of the digital input values that are to be encoded in them to compose the glyphs 31a–31d from a stored set of suitable graphical primitives. Or, the glyphs 31a–31d may be stored in fully constructed form in a table look-up memory or the like (not shown) to be written out on command in response to the digital values they encode.

Still other bi-state and polystate graphical characteristics that can be used in the composite glyphs of a self-clocking glyph code of the foregoing type will suggest themselves. For example, color (or, more precisely, spectral signature) can be utilized in the glyphs of such a glyph code as either a bi-state or a polystate characteristic. Indeed, it will be evident that the subtractive primaries (cyan, magenta and yellow) plus the black that are used in conventional color printers are suitable for encoding two or more bits (i. e., m-bit long bit strings, where m is $\geq 2$) in the colors of the composite glyphs 31a–31d, thereby extending the encoding capacity of the glyph code 23 to four or more bits per glyph. If this relatively straightforward extension is employed, the glyphs 31a–31d may have strictly bi-state graphical characteristics or a mixture of bi-state and polystate characteristics, depending on whether they are designed to encode one or more than one bit in their color. Moreover, the glyphs 31*a*–31*d* of such an extended code may have unused encoding states, but those states simply can be ignored during the decoding of the code because they represent "don't care" values. If color is used for encoding, the loss of the data encoded therein as a result, for example, of "black and white copying" of the code, will not affect the data encoded, for example, in the shapes and/or orientations of the glyphs.

Conclusion

In view of the foregoing, it will now be understood that the present invention provides a self-clocking glyph code that is especially well suited for transferring machine readable multi-bit digital values back and forth between the hardcopy domain and the electronic domain. Furthermore, it will be evident that various techniques can be used for writing and reading this glyph code. It also will be appreciated that the glyph code of this invention can take a wide variety of different forms.

What is claimed:

1. A self-clocking glyph code for transferring multi-bit digital values back and forth between an electronic domain and a hardcopy domain, said code comprising a logically ordered sequence of mutually independent glyphs that are written on said recording medium in accordance with a predetermined spatial formatting rule, said glyphs all being of substantially uniform size;

each of said glyphs having a plurality of predetermined, discriminable graphical characteristics; and each of said graphical characteristics having a plurality of predetermined, discriminable graphical states;

said multi-bit digital values being distributively encoded in a predetermined logical order in the states of the graphical characteristics of respective ones of said glyphs, whereby each of said digital values is encoded as a plurality of logically ordered bit strings.

2. The self-clocking glyph code of claim 1 wherein each of said graphical characteristics has two permissible states for the encoding of respective one bit long bit strings in the states of the respective graphical characteristics.

3. The self-clocking glyph code of claim 1 wherein at least one of said graphical characteristics has $2^m$ permissible states, where $m \geq 2$, for the encoding of m-bit long bit strings therein.

4. The self-clocking glyph code of claim 3 wherein wherein said one graphical characteristic is color.

5. The self-clocking glyph code of any of said claims 1–4 wherein wherein said predetermined graphical characteristics are substantially orthogonal to each other.

\* \* \* \* \*